United States Patent [19]

Dilworth et al.

[11] Patent Number: 5,479,400
[45] Date of Patent: Dec. 26, 1995

[54] TRANSCEIVER SHARING BETWEEN ACCESS AND BACKHAUL IN A WIRELESS DIGITAL COMMUNICATION SYSTEM

[75] Inventors: Robert P. Dilworth, Santa Cruz; George H. Flammer, III, Cupertino; Brett D. Galloway, Campbell, all of Calif.

[73] Assignee: Metricom, Inc., Los Gatos, Calif.

[21] Appl. No.: 254,205

[22] Filed: Jun. 6, 1994

[51] Int. Cl.[6] .................................................. H04B 7/212
[52] U.S. Cl. ........................ 370/60; 370/75; 370/94.1; 370/95.3; 379/59; 379/63; 455/33.1; 455/56.1
[58] Field of Search ............................. 370/94.1, 24, 30, 370/60, 71, 73, 75, 95.1, 95.3; 379/58–60, 63; 455/33.1, 33.2, 49.1, 54.1, 56.1

[56] References Cited

U.S. PATENT DOCUMENTS

| | | | |
|---|---|---|---|
| 4,918,437 | 4/1990 | Jasinski et al. | 379/60 X |
| 5,128,934 | 7/1992 | Jasinski | 455/33.1 X |
| 5,129,096 | 7/1992 | Burns | 455/33.1 X |
| 5,257,399 | 10/1993 | Kallin et al. | 455/33.1 |
| 5,355,522 | 10/1994 | Demange | 455/56.1 X |

Primary Examiner—Douglas W. Olms
Assistant Examiner—Russell W. Blum
Attorney, Agent, or Firm—Townsend and Townsend and Crew; Kenneth R. Allen; Dan H. Lang

[57] ABSTRACT

A microcellular digital packet communication system is provided for digital communication having a plurality of repeating packet-mode fixed-site transceivers each being at a plurality of different sites and each being capable of communicating on mutually-common frequencies, including for example by means of frequency-hopping spread spectrum, wherein a terminal transceiver directly communicates substantially simultaneously with at least a few of the fixed-site transceivers on the mutually-common frequencies and distributes information packets of a single originating message among the fixed-site transceivers, the fixed-site transceivers forwarding the information packets via multiple communication links to a single destination terminal on the mutually-common frequencies at which the message is reassembled. The system enables reliable handoffs and robust connectivity by maintaining multiple simultaneous communication links between terminal transceivers and repeating transceivers.

17 Claims, 2 Drawing Sheets

TRANSCEIVER SHARING BETWEEN ACCESS AND BACKHAUL IN A WIRELESS DIGITAL COMMUNICATION SYSTEM

BACKGROUND OF THE INVENTION

This invention relates to wireless digital communication systems, and in particular to microcellular packet communication systems, and more particularly to microcellular personal communication systems employing packet communication protocols with a backhaul channel for communication with a wire communication infrastructure.

As personal wireless communication systems such as in cellular telephony proliferate, the spectrum available to the wireless user for accessing cell sites for interactive communication becomes premium. There is great pressure to shrink the cell size of cellular telephone systems, for example, in order to promote frequency reuse and ultimately increase user density and capacity, as well as to reduce the required transmitter power for battery-operated portables. This is the trend toward so-called microcellular systems.

A major drawback of conventional microcellular architectures and systems is the cost of the infrastructure. As the number of required cell sites increases, there is a corresponding increase in the requirement for capital outlay for fixed cell site transmitters and receivers as well as increased maintenance overhead for the fixed cell sites. One of the major cost considerations in a communications architecture is the need to provide a backhaul channel. A backhaul channel is a communication link between the cell sites and the trunk resource or the switching fabric of the wire communication system. It has been assumed that the backhaul channel must be a wired connection between the cell site and the wired communication system, including the nearest central office of the public telephone systems. However, the best cell sites are frequently not convenient or even suited for wired channel connection into the wire communication system.

In the past the conventional wisdom has been to model and provide backhaul access and actual backhaul communication of the same bandwidth capacity. One reason for this modeling scheme is that it was not known how best to model or control wireless central switching.

Metricom, the assignee of the present invention, has developed a communication system which is used for access/backhaul, with wired access to thousands of remotely-located nodes and then a wireless infrastructure for relatively high-density communication by means of a purely wireless peer-to-peer packet communication-based network. This systems architecture is distinguishable as an inverse of a wireless microcellular architecture with a wired backhaul channel. What is needed is a communication system which has a backhaul channel provided without the difficulties and expense associated with providing a wired backhaul channel.

SUMMARY OF THE INVENTION

According to the invention, a microcellular digital packet communication system is provided for digital communication having a plurality of repeating packet-mode fixed-site transceivers each being at a plurality of different sites and each being capable of communicating on mutually-common frequencies, including for example by means of frequency-hopping spread spectrum, wherein a terminal transceiver directly communicates substantially simultaneously with at least a few of the fixed-site transceivers on the mutually-common frequencies and distributes information packets of a single originating message among the fixed-site transceivers, the fixed-site transceivers forwarding the information packets via multiple communication links to a single destination terminal on the mutually-common frequencies at which the message is reassembled. Control packets are used to verify the existence of links, and information packets are all routed via various paths to a single destination terminal on the mutually-common (inband) frequencies. The system enables reliable handoffs and robust connectivity by maintaining multiple simultaneous communication links between terminal transceivers and repeating transceivers. The system also works well with channel-hopping spread spectrum.

This invention has the advantage of minimizing the number and expense of transceivers (and antennas or wire) in a wired or wireless communication system by sharing resources for access and backhaul. The system is applicable to both data and voice communication.

The invention will be better understood by reference to the following detailed description in connection with the accompanying drawings.

DESCRIPTION OF SPECIFIC EMBODIMENTS

Figure 1:
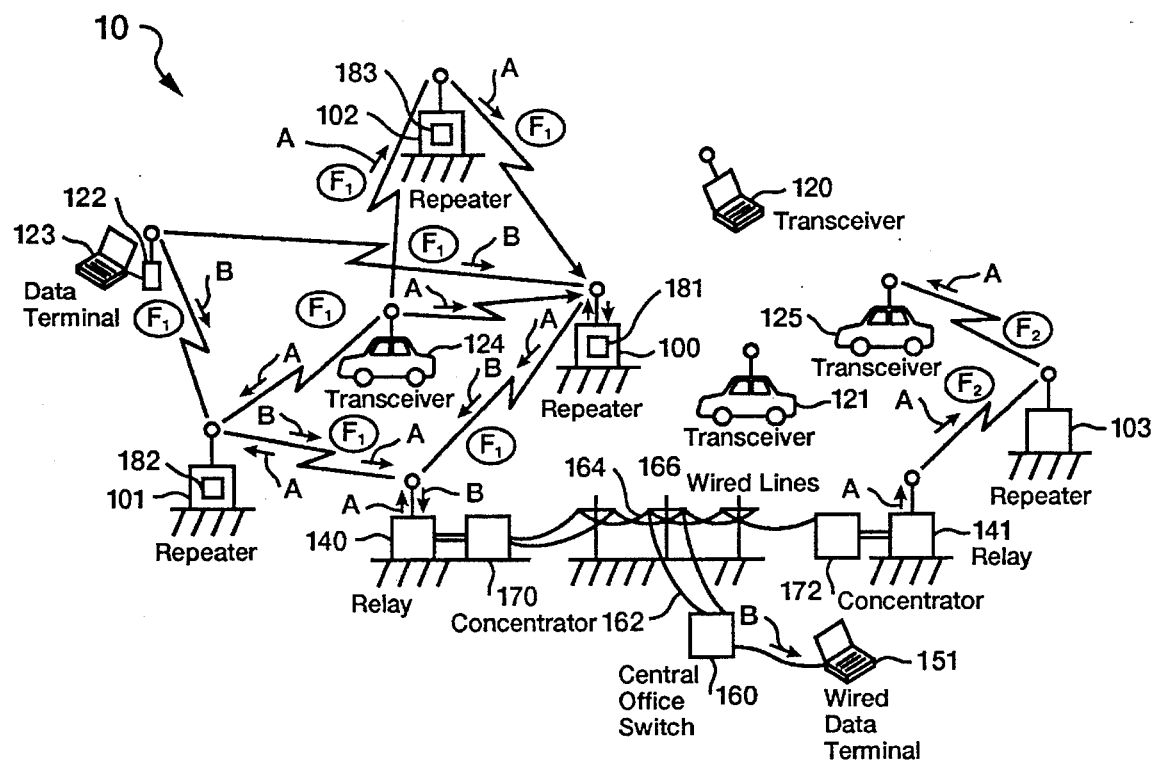
FIG. 1 is a block diagram of a microcellular system with a wireless inband backhaul channel (half duplex, single channel, single transceiver).

Referring to FIG. 1, there is shown a microcellular wireless communication system 10 comprising user terminals in the form of mobile and portable packet terminal node controller-equipped transceivers 120, 121, 122, 124, 125, including typically a connection to a data terminal 123, which may communicate with each other or with conventional wired data terminals (and in some cases telephones), e.g., data terminal 151, connected to a central office switch 160 over conventional wired telecommunication lines 162, 164, 166. Trunk terminals or concentrators 170, 172 may provide the interface to the telephone lines 164, 166.

In accordance with the invention, the microcellular wireless system 10 employs a plurality of fixed site repeaters 100, 101, 102, 103 to both capture the signals of the mobile and portable transceivers and to provide wireless backhaul channels to the central office switch 160. In the embodiment of FIG. 1, the backhaul channel is on the same frequency channel as the frequency channel used for communication between the mobile and portable transceivers and the fixed site repeaters. Thus, no extra wiring is needed between the fixed site repeaters and wireless-to-wireline relays 140, 141, which are coupled to the concentrators 170, 172.

An illustrative example is useful in understanding the invention. A mobile transceiver 124 (in a vehicle) originates a message comprising a sequence of message segments, such as a self-contained digitized message segment A in packet format (with address header, etc.) on a frequency Fl. Because it is in packet format, the message segment S is essentially self-contained and includes in its header information to address it to a local destination and an ultimate destination, namely, a number of fixed site repeaters 100, 101, 102, and ultimately another terminal, such as mobile transceiver node 125. The message A is sent to one or more fixed site repeaters 100, 101, 102 known to the mobile transceiver 124, either in a broadcast format (on the same frequency) or targeted in a sequence of directed acknowledgeable message segments (via a communication link maintained between the terminal 124 and each of the various repeaters 100, 101, 102, each having a different local address. Imbedded within the fixed site repeaters are controllers 181, 182, 183 for responding to, readdressing and distributing the packets containing message segment A received from the mobile transceiver 124. The message segment A is relayed according to the invention under supervision of the controllers 181, 182 183 by the fixed site repeaters 100, 101,102 a few milliseconds following receipt of the message segment originating at terminal 124 on the same frequency F1, the message segment A addressed initially for example to fixed site repeater 102 bering readdressed and relayed to fixed site repeater 100, and only one message segment A from fixed site relay 100 being readdressed to a fixed site relay, such as relay 140. This link arrangement is a high reliability replacement of the conventional wired backhaul channel. The message segment A is captured by relay 140 and relayed through telephone lines, if needed, to another relay 141, which transmits the readdressed message segment A on frequency F2 from its relay station to the fixed site repeater 103. The message segment A is then directed by fixed site repeater 103 on frequency F2 to the ultimate destination transceiver terminal 125.

In a similar manner, a message segment B from transceiver 122 on frequency F1 is relayed to and by each of repeaters 100, 101, also on frequency F1 to the relay 140, by which means of the concentrator 170 and the central switch 160 it is relayed to the data terminal 151.

A challenge to the straight-forward implementation of such a system is the use of asynchronous frequency hopping signaling to distribute the information to and from mobile stations which are in communication with the repeaters whose packet address is primarily a location indicator. It is difficult for a mobile transceiver to find an appropriate fixed site repeater under such circumstances, since it is not possible within established protocols to send broadcast messages to neighbors. Hence, in idle (non-message) time periods, control packet signals may be exchanged on the common frequency, which may change each half second or so, to circulate and maintain a list of available local fixed site relay stations and to verify the existence of an available link. The transceivers and the relays are in frequent contact, reporting to one another which other stations are operating and what the quality of the wireless links are. The controller in each fixed site relay may be equipped with sufficient flexibility to serve as a data prioritizer and message concentrator, killing redundant messages or granting highest priority to high-time-value traffic, such as real-time voice. It is therefore very easy to scale a microcellular system of this type of design, since there is minimal incremental cost to adding a relay station. Wired backhaul channels are no longer required. This arrangement works particularly well for "inbound" messages, that is, for messages originating from a mobile transceiver terminal into a wired infrastructure which has a stable address structure. For outbound messages to a mobile terminal, the outbound message handlers must track down the mobile transceiver by contacting the fixed site transceiver last known to have communicated with the targeted mobile terminal. Therein the controller should have stored information equivalent to a forwarding address.

Figure 2:
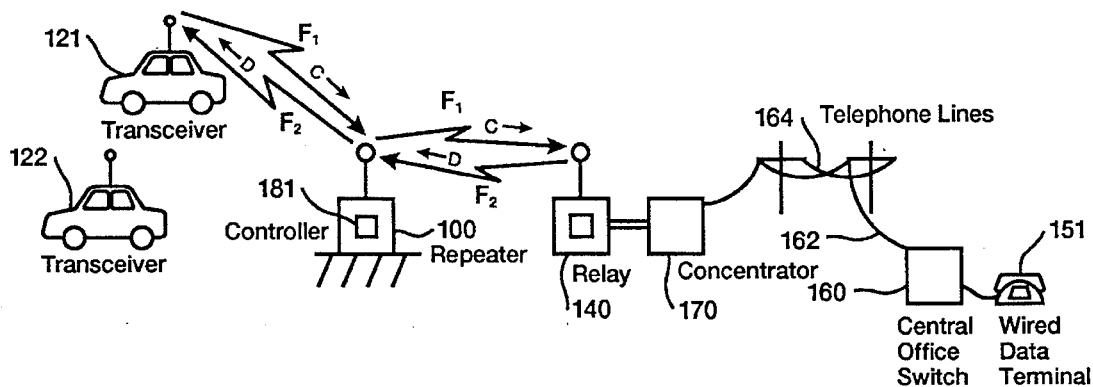
FIG. 2 is a block diagram of a microcellular system with a wireless backhaul channel (full duplex, dual channel dual transceiver).

In the embodiment hereinabove, the interchange thus far described between wireless sites has been illustrated in terms of a single mutually common frequency channel. Referring now to FIG. 2, there is shown an alternative embodiment to the present invention, there is shown a similar system wherein the signaling scheme is full duplex. In FIG. 2, the signal interchange is substantially simultaneous on both a first frequency F1 and a second frequency F2. (Such a system may involve so-called crossband operation so that there is adequate separation between signals transmitted and signals received to minimize intra-device interference. For example, a message C originating with a transceiver 121 may be involved in a packet interchange on frequency F1 while another unrelated message D (originating typically from the destination of message C) is involved in a packet interchange on a frequency F2, both messages being relayed through fixed site repeater 100 under control of controller 181, and an inband backhaul channel pair on frequencies F1 and F2 are used to communicate with relay 140 connected to concentrator 170 in turn wired to telephone lines 164, 162 through a central office switch to data terminal 151. To/from message routing need not be via the same paths for each packet. The inherent store and forward capability of the controller 181 in each wireless relay can be used to great advantage to assure the reliable delivery and relay of packetized messages. Where bandwidth and channel capacity becomes an issue, additional wireless backhaul relay devices can be added at strategic locations and the cell size or coverage area of a cellular repeater can be reduced (e.g., by lowering effective radiated power under automatic control) without unduly burdening the system with added infrastructure requiring additional solid wiring or cabling. Hence, a microcellular environment can be built up and expanded with minimal administrative and structural overhead.

The invention has now been explained with reference to specific embodiments. Other embodiments will be apparent to those of skill in the art. It is therefore not intended that this invention be limited, except as indicated by the appended claims.

What is claimed is:

1. A digital packet communication system for digital data communication, said communication system comprising:

a plurality of repeating packet-mode fixed-site wireless transceiver means;

at least one wireless non-fixed-site terminal transceiver means capable of originating targeted information packets, said non-fixed-site terminal transceiver means including a modulator means for directly communicating substantially simultaneously with at least a few of said plurality of fixed-site transceiver means over a plurality of different communication links on mutually-common frequencies; and destination terminal transceiver means capable of receiving the targeted information packets;

said wireless non-fixed-site terminal transceiver means comprising 1) means for managing exchange of said targeted information packets and control packets with said plurality of fixed-site transceiver means and in particular with said few fixed-site transceiver means, and 2) means for distributing said information packets of a single originating message among said few of said fixed-site transceiver means, said few fixed-site transceiver means being operative to forward said targeted information packets of said single originating message to said destination terminal means, said destination terminal means being operative to reassemble said targeted information packets into a single message while eliminating redundant packets; and said fixed-site transceiver means each comprising transmitter means and receiver means shared between communications with other fixed-site transceiver means over said mutually common frequencies and communication with said wireless non-fixed site terminal transceiver means over said mutually common frequencies.

2. The system of claim 1 wherein said fixed-site transceiver means each include means for conveying targeted information packets of a single target message to said destination terminal means, such that said destination terminal means receives said targeted information packets from said few of said fixed-site transceiver means via said mutually-common frequencies.

3. The system of claim 1 wherein at least one of said fixed-site transceiver means is capable of communicating selected ones of said targeted information packets with selected other fixed-site transceiver means only via another intervening fixed-site transceiver means.

4. The system of claim 1 wherein said wireless non-fixed-site terminal transceiver means is operative to exchange said control packets separate from said information packets on a frequency in common with related information packets among at least a few of said fixed-site transceiver means to maintain information on availability and quality of said communication links.

5. The system of claim 1 wherein said wireless non-fixed-site terminal transceiver means is operative to exchange said control packets separate from said information packets on a frequency in common with related information packets between said wireless non-fixed-site terminal transceiver means and at least a few of said fixed-site transceiver means to maintain information on availability and quality of said communication links.

6. The system of claim 2 wherein said targeted information packets of a single message are received at said destination terminal transceiver means via a plurality of said mutually-common frequencies.

7. In a digital packet communication system for digital communication having a plurality of repeating packet-mode fixed-site wireless transceiver means, said fixed-site transceiver means each being at a plurality of different sites and each having modulator means for communicating on mutually-common frequencies, a method for communication of targeted information packets and control packets comprising:

using a non-fixed-site wireless terminal transceiver means for establishing wireless two-way communications with at least a few of said plurality of said fixed-site transceiver means over a plurality of communication links on said mutually-common frequencies of said fixed-site transceiver means;

using said non-fixed-site wireless terminal transceiver means for managing exchange of said targeted information packets and control packets with said plurality of fixed-site transceiver means and in particular with said few fixed-site transceiver means;

using said non-fixed-site wireless terminal transceiver means for distributing said targeted information packets of a single originating message among said few of said fixed-site transceiver means, such that said targeted information packets are interleaved among a plurality of said transceiver means;

using said fixed-site transceiver means for forwarding said targeted information packets of said single originating message to a single destination terminal means, said single destination terminal means operative to reassemble said information packets into a single message while eliminating redundant packets; and using a transmitter means and receiver means within at least one of said non-fixed-site transceiver means for exchanging packets with said non-fixed-site wireless terminal transceiver means and for exchanging packets with another of said fixed-site transceiver means on a time-shared basis over said mutually common frequencies, whereby said transmitter means and receiver means are shared between communications with said another fixed-site transceiver means and communications with said non-fixed-site transceiver means.

8. The method of claim 7 further comprising the step of using said fixed-site transceiver means for conveying the targeted information packets of a single target message to said one destination terminal transceiver means, such that said destination terminal transceiver means receives said targeted information packets from said few of said fixed-site transceivers via said mutually-common frequencies.

9. The method of claim 7 further comprising the step of communicating selected ones of said targeted information packets with selected other fixed-site transceiver means only via another intervening fixed-site transceiver means.

10. The method of claim 7 further comprising the step of exchanging said control packets separate from said targeted information packets on a frequency in common with related targeted information packets among at least a few of said fixed-site transceiver means to maintain information on availability and quality of said communication links.

11. The method of claim 7 further comprising the step of using said non-fixed-site terminal transceiver means to exchange said control packets separate from said targeted information packets on a frequency in common with related targeted information packets between said non-fixed-site terminal transceiver means and at least a few of said fixed-site transceiver means to maintain information on availability and quality of said communication links.

12. The system of claim 7 further comprising the step of receiving said targeted information packets of a single message at said destination terminal means via a plurality of said mutually-common frequencies.

13. A microcellular digital packet communication system for digital data communication, said communication system comprising:

a plurality of repeating packet-mode fixed-site wireless transceiver means, said fixed-site transceiver means each being at a plurality of different sites and each having modulator means for communicating on mutually-common frequencies;

at least one wireless non-fixed-site terminal transceiver means capable of originating targeted information packets, said non-fixed-site terminal transceiver means including a modulator means for directly communicating substantially simultaneously with at least a few of said plurality of fixed-site transceiver means over a plurality of different communication links on said mutually-common frequencies; and destination terminal transceiver means capable of receiving the targeted information packets;

said wireless non-fixed-site terminal transceiver means comprising means for managing exchange of said targeted information packets and control packets with said plurality of fixed-site transceiver means and in particular with said few fixed-site transceiver means for distributing said information packets of a single originating message among said few of said fixed-site transceiver means, said few of said fixed-site transceiver means being operative to forward said targeted information packets of said single originating message to said destination terminal means, said destination terminal means being operative to reassemble said targeted information packets into a single message while eliminating redundant packets, wherein said targeted information packets of a single message are received via a plurality of said mutually-common frequencies.

14. In a microcellular digital packet communication system for digital communication having a plurality of repeating packet-mode fixed-site wireless transceiver means, said fixed-site transceiver means each being at a plurality of different sites and each having modulator means for communicating on mutually-common frequencies, a method for communication of targeted information packets and control packets comprising:

using a control means at a non-fixed-site wireless terminal transceiver means for establishing wireless two-way communications with at least a few of said plurality of said fixed-site transceiver means over a plurality of communication links on said mutually-common frequencies of said fixed-site transceiver means;

using said non-fixed-site wireless terminal transceiver means for managing exchange of said targeted information packets and control packets with said plurality of fixed-site transceiver means and in particular with said few fixed-site transceiver means;

using said non-fixed-site wireless terminal transceiver means for distributing said targeted information packets of a single originating message among said few of said fixed-site transceiver means, such that said targeted information packets are interleaved among a plurality of said transceiver means;

using said fixed-site transceiver means for forwarding said targeted information packets of said single originating message to a single destination terminal means, said single destination terminal means operative to reassemble said information packets into a single message while eliminating redundant packets; and using said destination terminal means to receive said targeted information packets of a single message via a plurality of said mutually-common frequencies.

15. A digital packet communication network comprising:

a plurality of mobile wireless transceivers that originate, transmit, and receive packets, ultimate destination addresses and intermediate destination addresses being included within said packets;

a plurality of fixed-site wireless repeaters, each said wireless repeater including a single receiver that receives packets, a single transmitter that relays packets received by said single receiver, each said wireless repeater modifying intermediate address information of said packets after receipt by said single receiver and prior to transmission by said single transmitter; and a destination transceiver that exchanges packets with at least one of said fixed-site wireless repeaters, said destination transceiver being coupled to a wired network and exchanging packets with a terminal coupled to said wired network, said destination transceiver relaying packets for ultimate receipt by selected ones of said mobile wireless transceivers;

each said single receiver directly receiving packets from selected ones of said plurality of mobile wireless transceivers and selected ones of said plurality of fixed-site wireless repeaters that are within communications range; and each said single transmitter directly transmitting packets to selected ones of said plurality of mobile wireless transceivers, said plurality of fixed-site wireless repeaters, and said destination transceiver that are within communications range.

16. The packet communication network of claim 15 wherein each said repeater selects an available frequency for transmission of each packet to be relayed from a plurality of predetermined frequencies.

17. The packet communication network of claim 16 wherein said plurality of predetermined frequencies is the same for transmission to said mobile transceivers and for transmission to said fixed-site repeaters.

\* \* \* \* \*